US009594735B2

(12) United States Patent
Bhargav et al.

(10) Patent No.: US 9,594,735 B2
(45) Date of Patent: Mar. 14, 2017

(54) AUTOMATIC HIGHLIGHTING OF FORMULA PARAMETERS FOR LIMITED DISPLAY DEVICES

(75) Inventors: Rajat Bhargav, Hyderabad-IDC (IN); Manish Sethi, Hyderabad-IDC (IN); Raghvendra Maloo, Hyderabad-IDC (IN); Siddhartha Agrawal, Mumbai (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 538 days.

(21) Appl. No.: 13/230,696

(22) Filed: Sep. 12, 2011

(65) Prior Publication Data

US 2013/0067306 A1 Mar. 14, 2013

(51) Int. Cl.
G06F 17/24 (2006.01)
G06F 17/21 (2006.01)

(52) U.S. Cl.
CPC ............ *G06F 17/24* (2013.01); *G06F 17/246* (2013.01)

(58) Field of Classification Search
CPC ...... G06F 17/30; G06F 17/246; G06F 17/245; G06F 17/211; G06F 17/2247; G06F 17/24
USPC .................................. 715/212, 217, 219, 220
See application file for complete search history.

(56) References Cited

U.S. PATENT DOCUMENTS 4,763,356 A * 8/1988 Day et al. ...................... 379/368
5,685,001 A 11/1997 Capson .......................... 715/212
5,717,939 A 2/1998 Bricklin ......................... 715/212
5,949,416 A * 9/1999 Bush ............................. 715/708
6,055,548 A 4/2000 Comer ........................... 715/212
(Continued)

FOREIGN PATENT DOCUMENTS

CN 1790259 A 6/2006
CN 102156614 A 8/2011
(Continued)

OTHER PUBLICATIONS

DataViz.com; "Documents to Go for iPhone/iPad/iPod Touch Help"; Retrieved Date: Jun. 29, 2011; accessed at: http://www.dataviz.com/handheld/support/documentstogo/iphone/#__Working_with_Sheets; 24 pgs.
(Continued)

*Primary Examiner* — Scott Baderman
*Assistant Examiner* — Hassan Mrabi
(74) *Attorney, Agent, or Firm* — Dave Ream; Tom Wong; Micky Minhas

(57) ABSTRACT

A formula bar is used for receiving user input for entry/editing of formulas using touch input and/or a Soft Input Panel (SIP) designed for formula input. In response to a user initiating entry of a formula, a list of formulas is displayed based on the user's input. A formula may be selected and displayed within the formula bar with a parameter highlighted. The user may then enter the value for the parameter (e.g. a single value, a range, another formula, and the like) using touch input and/or SIP input. As the user enters the value for each parameter, the next parameter for the formula is automatically highlighted. The formula may be validated to determine if the parameters for the formula have been entered correctly. Tips may also be displayed in/near the display of the formula bar to provide assistance to the user entering the formula.

20 Claims, 10 Drawing Sheets

(56) References Cited

U.S. PATENT DOCUMENTS

| | | | |
|---|---|---|---|
| 6,057,837 | A | 5/2000 | Hatakeda et al. |
| 6,202,060 | B1 | 3/2001 | Tran |
| 6,252,592 | B1* | 6/2001 | King ............... G06F 8/34 715/764 |
| 6,502,233 | B1* | 12/2002 | Vaidyanathan et al. ...... 717/101 |
| 6,549,878 | B1 | 4/2003 | Lowry |
| 7,127,672 | B1* | 10/2006 | Patterson et al. ............. 715/220 |
| 7,231,593 | B1 | 6/2007 | Raja ............................. 715/210 |
| 7,272,783 | B2 | 9/2007 | Bauchot ....................... 715/213 |
| 7,412,645 | B2 | 8/2008 | Kotler .......................... 715/212 |
| 7,451,397 | B2 | 11/2008 | Weber |
| 7,467,350 | B2 | 12/2008 | Aureglia |
| 8,112,701 | B2 | 2/2012 | Gur |
| 8,151,213 | B2 | 4/2012 | Weitzman |
| 8,255,789 | B2 | 8/2012 | Berger |
| 2001/0049695 | A1 | 12/2001 | Chi |
| 2002/0095657 | A1* | 7/2002 | Vaidyanathan ....... G06F 9/4446 717/110 |
| 2002/0118221 | A1 | 8/2002 | Hudson et al. |
| 2003/0033329 | A1 | 2/2003 | Bergman |
| 2004/0119763 | A1 | 6/2004 | Mizobuchi |
| 2005/0055262 | A1* | 3/2005 | Florczak .......................... 705/9 |
| 2006/0129929 | A1* | 6/2006 | Weber et al. ................. 715/538 |
| 2006/0129932 | A1 | 6/2006 | Weber et al. |
| 2006/0218483 | A1 | 9/2006 | Weitzman |
| 2007/0067732 | A1* | 3/2007 | Kang ................. G06F 3/04892 715/767 |
| 2007/0111188 | A1 | 5/2007 | Shell |
| 2008/0165141 | A1 | 7/2008 | Christie |
| 2008/0168341 | A1 | 7/2008 | Payette |
| 2009/0044091 | A1 | 2/2009 | Gur |
| 2009/0066656 | A1 | 3/2009 | Jung et al. |
| 2009/0083615 | A1* | 3/2009 | Kotler ................... G06F 17/246 715/219 |
| 2009/0313567 | A1 | 12/2009 | Kwon et al. |
| 2010/0083086 | A1 | 4/2010 | Berger et al. |
| 2011/0010763 | A1 | 1/2011 | Beardslee ........................ 726/6 |
| 2013/0009881 | A1* | 1/2013 | Paul .............................. 345/173 |

FOREIGN PATENT DOCUMENTS

| | | |
|---|---|---|
| EP | 1278144 | 1/2003 |
| EP | 1 672 527 A2 | 6/2006 |
| EP | 2343637 A2 | 4/2011 |
| JP | H04357521 A | 12/1992 |
| JP | H06274333 A | 9/1994 |
| JP | 2003186614 A | 7/2003 |
| JP | 2004046657 A | 2/2004 |
| JP | 2006172445 A | 6/2006 |
| RU | 2406131 C2 | 12/2010 |

OTHER PUBLICATIONS

Khan, F.; "*Office Mobile 2010—released—Go Windows go*"; May 16, 2010; accessed Jun. 28, 2011 at http://blogs.technet.com/b/fareedmk/archive/2010/05/16/office-mobile-2010-released.aspx; 4 pgs.

Meeus, A.; "*Office Mobile on Windows Phone 7*"; Jan. 25, 2011; accessed Jun. 27, 2011 at http://blogs.technet.com/b/windows_phone_for_it_pros/archive/2011/01/25/office-mobile-on-windows-phone-7.aspx; 3 pgs.

Microsoft; "*Microsoft Office 2010 Engineering—Make Informed Decisions on the Go With Excel Mobile 2010*"; posted Mar. 31, 2010; Retrieved Date: Jun. 29, 2011; accessed at: http://blogs.technet.com/b/office2010/archive/2010/03/31/make-informed-decisions-on-the-go-with-excel-mobile-2010.aspx; 7 pgs.

Microsoft; "*Windows Mobile—Pocket Excel*"; Retrieved Date: Jun. 29, 2011; accessed at: http://download.microsoft.com/download/4/5/0/450cc644-a923-4944-a8e5-6483c0d4f8f6/2003_PocketExcel_PPC.pdf ; 28 pgs.

Miller, M.; "*Quickoffice Brings Cloud Document Access and Editing to Google Android*"; posted Jun. 9, 2010; Retrieved Date: Jun. 29, 2011; accessed at: http://www.zdnet.com/blog/cell-phones/quickoffice-brings-cloud-document-access-and-editing-to-google-android/3996; 6 pgs.

U.S. Appl. No. 13/227,134, filed Sep. 7, 2011, entitled "*Multi-Cell Selection Using Touch Input*".

Office Action mailed Jul. 18, 2013, in U.S. Appl. No. 13/227,134.

Office Action mailed Mar. 21, 2014, in U.S. Appl. No. 13/227,134, 17 pgs.

International Search Report mailed Feb. 18, 2013, in PCT/US2012/050444.

International Search Report mailed Jan. 2, 2013, in PCT/US2012/050556.

Office Action mailed Mar. 13, 2103, in U.S. Appl. No. 13/227,134.

Office Action mailed Oct. 15, 2012, in U.S. Appl. No. 13/227,134.

Chinese First Office Action and Search Report Received for Application No. 201210328140.2, Mailed Date: Jul. 8, 2014, 13 Pages.

Chinese First Office Action Received for Application No. 201210335135.4, Mailed Date: Nov. 26, 2014, 13 Pages.

Office Action mailed Nov. 20, 2014, in U.S. Appl. No. 13/227,134, 20 pgs.

Office Action mailed May 6, 2015, in U.S. Appl. No. 13/227,134, 27 pgs.

"Second Office Action and Search Report Issued in Chinese Patent Application No. 201210328140.2", Mailed Date: Mar. 6, 2015, 13 Pages.

Wikisysop, "Status Bar—LibreOffice Help", Published on: May 20, 2011, Available at: https://help.libreoffice.org/3.3/Calc/Status_Bar ; 2 pgs. (cited in Aug. 21, 2015 ISR).

Microsoft, Excel Magic Trick 778: Index & Match Lookup Functions Beginning to Advanced (18 Examples); Jun. 15, 2010; 1 page (cited in Aug. 6, 2015 ISR).

International Search Report dated Jul. 21, 2015 in Appln No. PCT/2012/050444, 5 pgs.

International Search Report dated Aug. 6, 2015 in Appln No. PCT/2012/050556, 6 pgs.

Chinese Second Office Action dated Aug. 7, 2015 in Appln No. 201210335135.4, 13 pgs.

"Fourth Office Action Issued in Chinese Patent Application No. 201210335135.4", Mailed Date: Aug. 31, 2016, 10 Pages.

"Notice of Allowance Issued in Japanese Patent Application No. 2014-530669", Mailed Date: Aug. 4, 2016, 3 Pages. (W/o English Translation).

"Office Action Issued in Japanese Patent Application No. 2014-530669", Mailed Date: Jun. 6, 2016, 4 Pages.

"Office Action Issued in Russian Patent Application No. 2014109371", Mailed Date: Aug. 11, 2016, 5 Pages. (W/o English Translation).

"Third Office Action Issued in Chinese Patent Application No. 201210335135.4", Mailed Date: Feb. 19, 2016, 9 Pages.

"Office Action Issued in Mexican Patent Application No. MX/a/20141002955", Mailed Date: Jun. 14, 2016, 11 Pages. (W/o English Translation).

\* cited by examiner

AUTOMATIC HIGHLIGHTING OF FORMULA PARAMETERS FOR LIMITED DISPLAY DEVICES

BACKGROUND

Limited display devices, such as smart phones, are increasingly being used to perform tasks traditionally performed using desktop computing devices with larger screens. Performing some tasks on a limited display device, however, are cumbersome for a user. For example, it may be difficult for a user to interact with some features of a spreadsheet on a limited display device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A formula bar is used for receiving user input for entry/editing of formulas using touch input and/or a Soft Input Panel (SIP) designed for formula input. In response to a user initiating entry of a formula, a list of formulas is displayed based on the user's input. A formula may be selected and displayed within the formula bar with a parameter highlighted. The user may then enter the value for the parameter (e.g. a single value, a range, another formula, and the like) using touch input and/or SIP input. For example, a user may use touch input to specify a multi-selection of cells (e.g. a range of cells) to enter the value for a range parameter. As the user enters the value for each parameter, the next parameter for the formula is automatically highlighted for entry of a value until the parameters for the formula are received. Each parameter may also be individually selected. For example, a user may tap a parameter to select it within the formula. Before terminating the formula editing session the formula may be validated to determine if the parameters for the formula have been entered correctly. Tips may also be displayed in/near the display of the formula bar to provide assistance to the user entering the formula.

DETAILED DESCRIPTION

Figure 1:
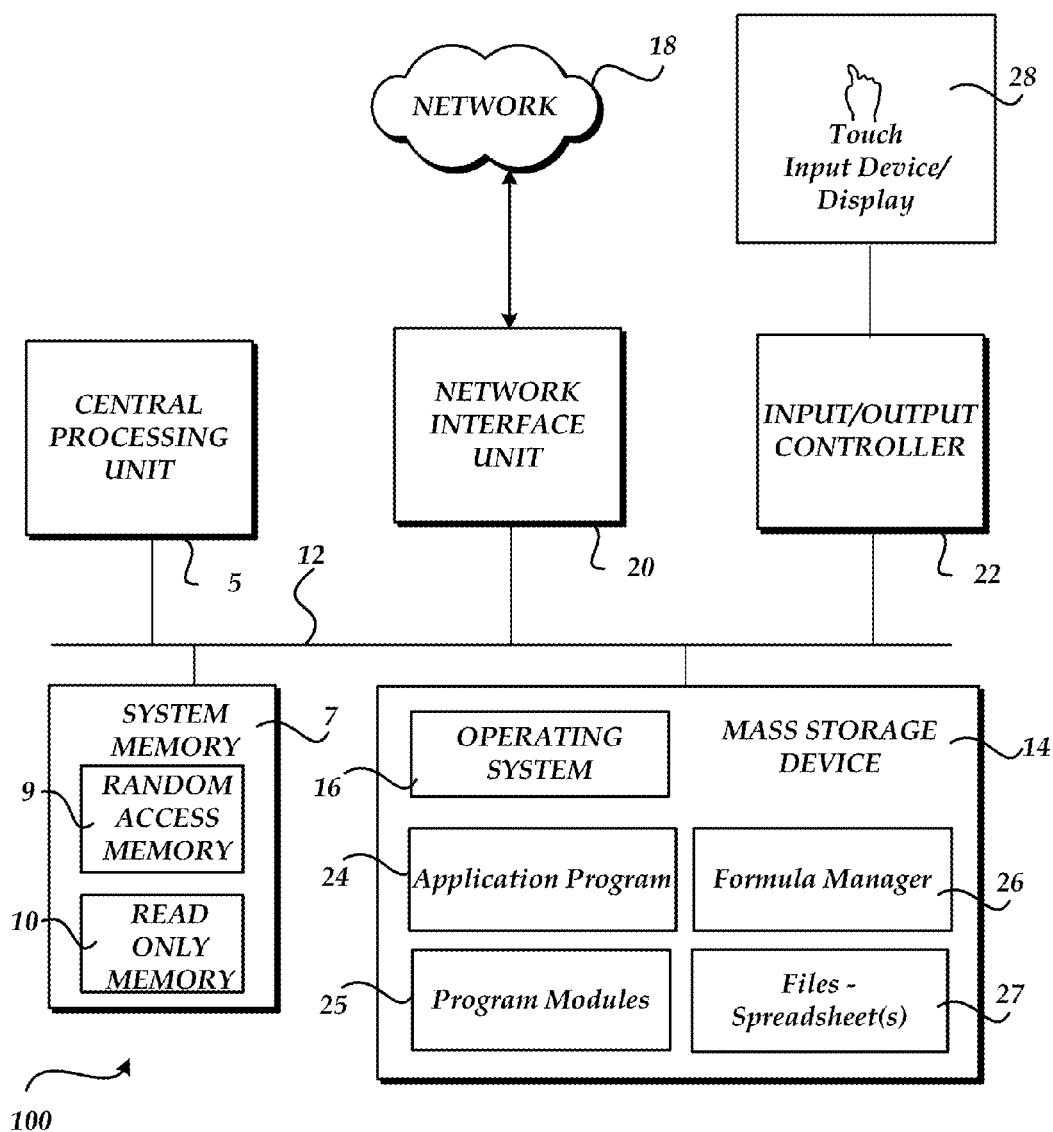
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a mobile computing device (e.g. smartphone, notebook, tablet . . . ) or desktop computer and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application program (s) 24, and other program modules 25, files 27 (e.g. spreadsheets) and formula manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a touch input device 28. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device 28 may also act as a display. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, with respect to the Unified Communications via application-specific logic integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a networked personal computer, such as the WINDOWS 7® operating system from MICROSOFT CORPORATION of Redmond, Wash. According to one embodiment, the operating system is configured to include support for touch input device 23. According to another embodiment, a formula manager 26 may be utilized to process some/all of the touch input that is received from touch input device 28.

The mass storage device 14 and RAM 9 may also store one or more program modules. In particular, the mass storage device 14 and the RAM 9 may store one or more application programs 24, such as a spreadsheet application. In conjunction with the operation of the application, formula manager 26 is used in entering/editing formulas for a spreadsheet. Generally, formula manager 26 is configured to assist in processing and receiving user input for entry/editing of formulas using touch input and/or a Soft Input Panel (SIP) designed for formula input. Additional details regarding the operation of formula manager 26 will be provided below.

Figure 2:
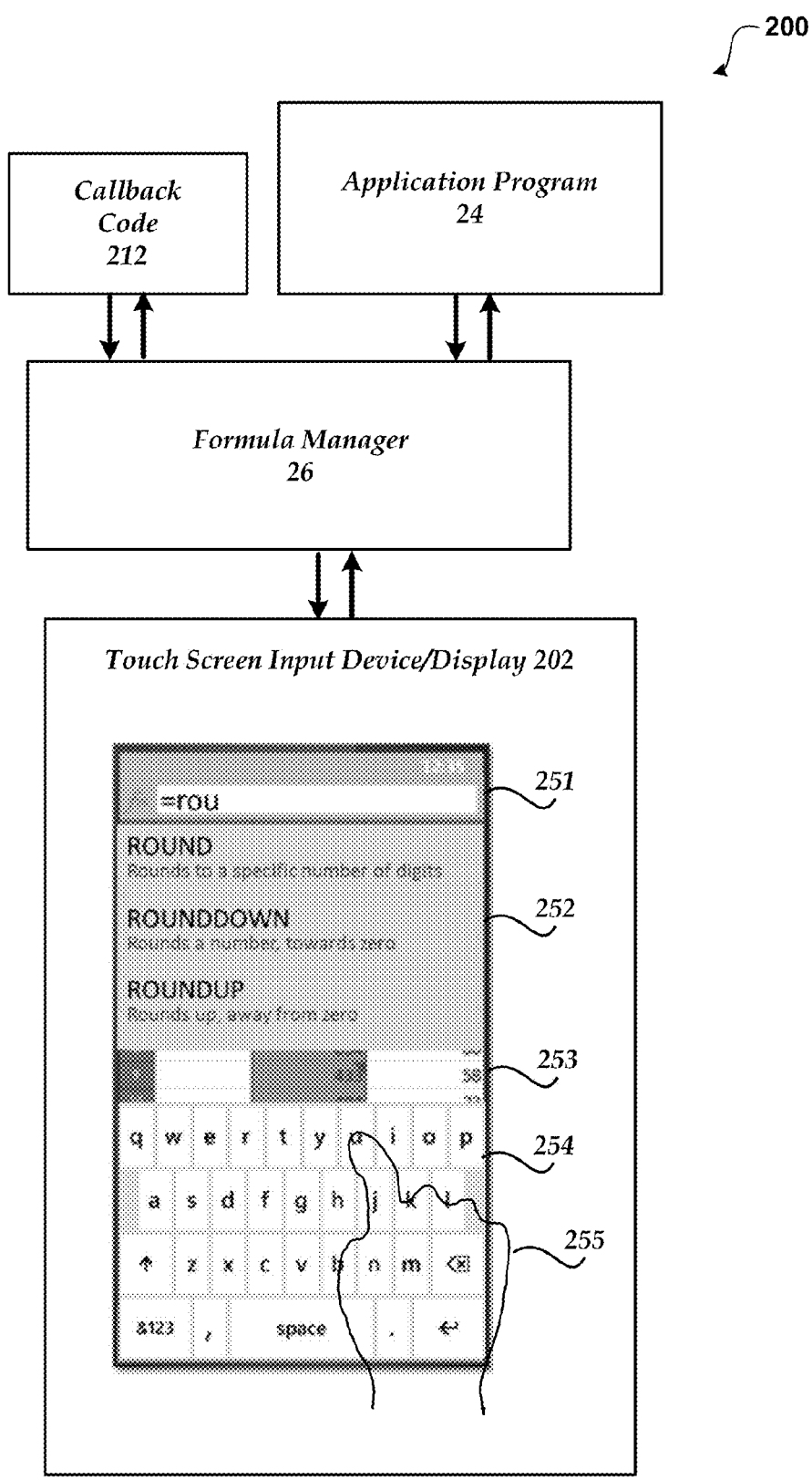
FIG. 2 illustrates an exemplary touch input system.

FIG. 2 illustrates an exemplary touch input system. As illustrated, system 200 includes application program 24, callback code 212, formula manager 26 and touch screen input device/display 202.

In order to facilitate communication with the formula manager 26, one or more callback routines, illustrated in FIG. 2 as callback code 212 may be implemented. According to one embodiment, application program 24 is a spreadsheet application that is configured to receive input from a touch-sensitive input device 202 and/or keyboard input (e.g. a physical keyboard and/or SIP). For example, formula manager 26 may provide information to application 24 in response to a user's finger (i.e. finger on hand 232) swipe across cells of a spreadsheet and/or a tap.

Touch input system 200 as illustrated comprises a touch screen input device/display 202 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Formula manager 26 is configured to process the received touch input from touch screen input device/display 202 and to assist a user in entering/editing a formula. As illustrated, touch screen input device/display 202 shows formula bar 251, list of formulas 252, spreadsheet 253 and SIP 254. In response to a user initiating entry of a formula (e.g. input "rou"), a list of formulas is displayed. As illustrated, a user has used their hand 255 to enter the characters "rou". A formula may be selected from the displayed list of formulas 252 and inserted within the formula bar with a first parameter highlighted (e.g. formula bar 414 in FIG. 4). The user may then enter the value for the parameter (e.g. a single value, a range, another formula, and the like) using touch input and/or SIP input. For example, a user may use touch input to specify a multi-selection of cells (e.g. a range of cells) to enter the value for a range parameter. As the user enters the value for each parameter, the next parameter for the formula is automatically highlighted for entry of a value until the parameters for the formula are received. Each parameter may also be individually selected. For example, a user may tap a parameter to select it within the formula. Before terminating the formula editing session the formula may be validated to determine if the parameters for the formula have been entered correctly. Tips may also be displayed in/near the display of the formula bar to provide assistance to the user entering the formula.

Figure 3:
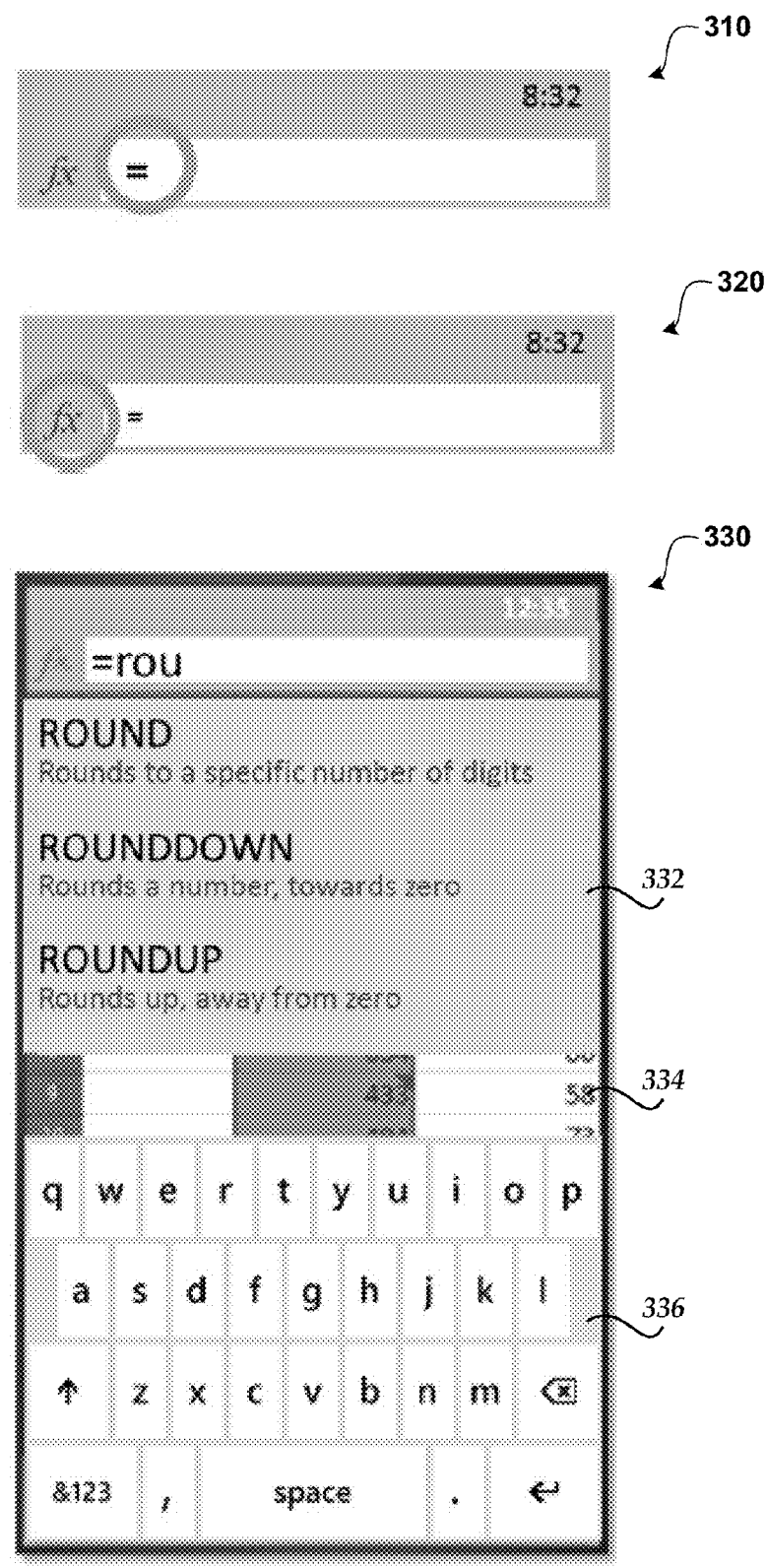
FIG. 3 shows different states of a formula bar and a display of formulas.

FIG. 3 shows different states of a formula bar and a display of formulas. As illustrated, FIG. 3 includes three different displays (310, 320, 330) that illustrate different states of a formula bar within the spreadsheet. The displays may be shown on a mobile device having a limited display size (e.g. a cell phone having a display of approximately 2 by 3 inches, a tablet having approximately a 7-10 inch display, and/or other devices having other display sizes). According to an embodiment, the displays includes a touch screen that is used to receive gestures to interact with creating/editing a formula and its parameters.

Display 310 shows an initial state of a formula bar. In the current example, a user has typed an equal ("=") sign to initiate formula entry.

Display 320 shows the user selecting a function (fx) button to initiate formula entry. According to an embodiment, the user taps on the fx button. In response to selecting the fx button, an equal sign is displayed within the formula bar.

In response to selecting the fx button and/or typing "=" within the formula bar, a list of formulas to display is determined. When the formula bar is empty (e.g. as in 310, 320), the list of formulas can be determined from each of the available formulas. For example, the list of formulas to display may start with: the most popular formulas, recently used formulas, an alphabetical list, a category list with formulas arranged by category, and the like. According to an embodiment, the input entered into the formula bar is used to filter the displayed formulas. As each character is entered, the formulas displayed dynamically change. A user may also delete one or more characters from the input that currently exists and/or the user typed in. The dynamic filtering of the function list can therefore result in either reducing or expanding the list of formulas being displayed.

In the example illustrated in display 330, the characters "rou" have been entered resulting in the display of formulas involving rounding. As illustrated, the filtered formulas are displayed in alphabetical order with each formula including a display of a formula name and a description of the formula. According to an embodiment, a displayed formula may be selected. For example, a user may tap on a formula name to select the formula. To assist a user in entering/editing a formula, a SIP (e.g. 336) is displayed when the list of formulas is displayed. A portion of the spreadsheet 334 may also be visible when displaying the SIP 336 and list of formulas 332. According to an embodiment, the list of formulas are displayed using an alpha blend (not shown in FIG. 3, See FIG. 5) such that a user can still see the spreadsheet that is underneath the display of the formulas.

Figure 4:
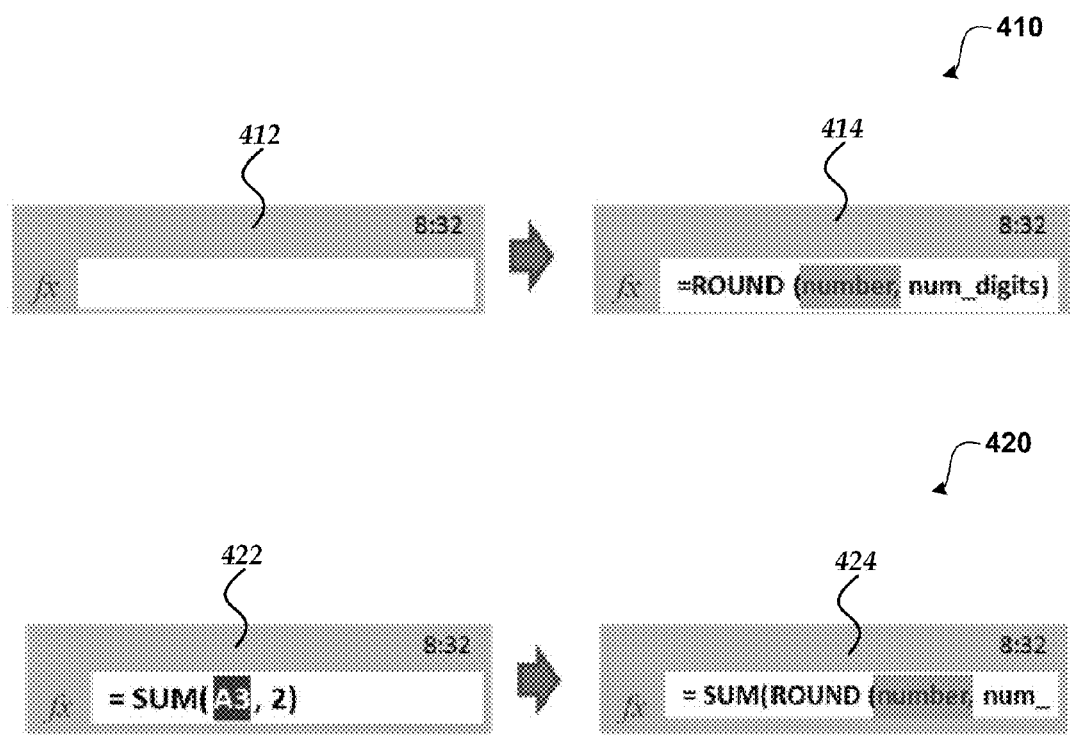
FIG. 4 shows different selections of a formula.

FIG. 4 shows different selections of a formula. As illustrated, FIG. 4 includes two different displays (410, 420) that illustrate selection of a formula for entry into the formula bar.

Illustration 410 shows an initially empty formula bar 412 and formula bar 414 that shows selection of a Round formula. For example, a user has selected the Round formula from the displayed list of formulas. In response to the selection, the Round formula and its parameters are placed into the formula bar (414). According to an embodiment, the first parameter (e.g. the number parameter) is highlighted (selected) such that a user may begin to enter a value for the selected parameter.

Illustration 420 shows a formula bar 422 that initially includes a Sum formula with the first parameter value "A3" selected. In response to a user selecting the Round formula, the value of the first parameter for the Sum formula is replaced with the Round formula and its parameters creating a nested formula. The selected text "A3" is replaced with the formula and parameter names with the first parameter of the Round formula selected. In this example, an "=" sign is not placed before the Round formula since it is a nested formula.

Figure 5:
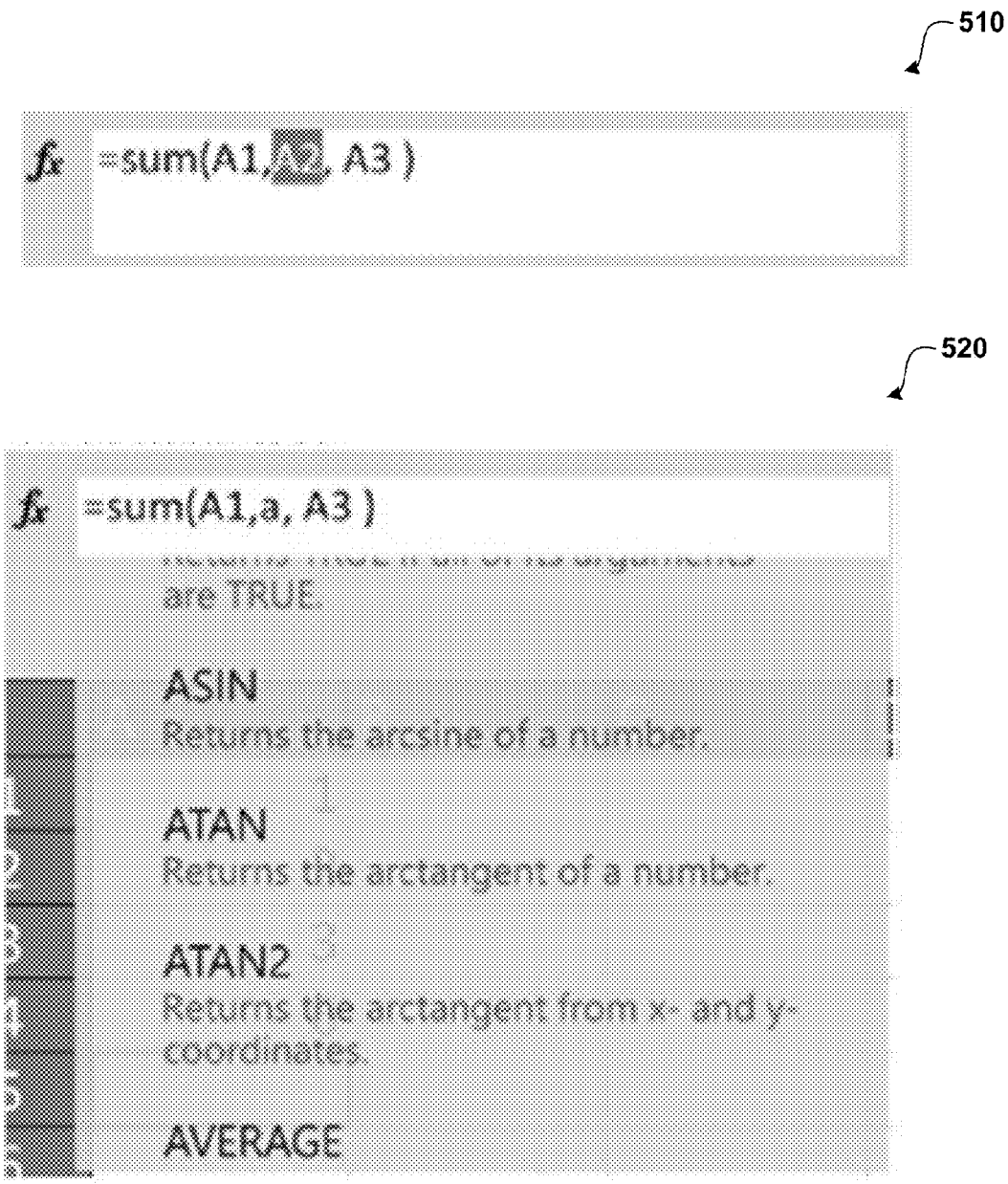
FIG. 5 shows a selection of a parameter and beginning to type a new value for the parameter.

FIG. 5 shows a selection of a parameter and beginning to type a new value for the parameter. As illustrated, FIG. 5 includes formula bar 510 that shows a Sum formula with the second parameter value "A2" selected.

Display 520 shows the user typing the character "a" to replace the selected parameter value "A2." In response to the user typing "a" a display of filtered formulas is displayed that match the "a" input. In the example illustrated, the display of the formulas is alpha blended such that the display of the spreadsheet below the display of the formulas can still be seen.

Figure 6:
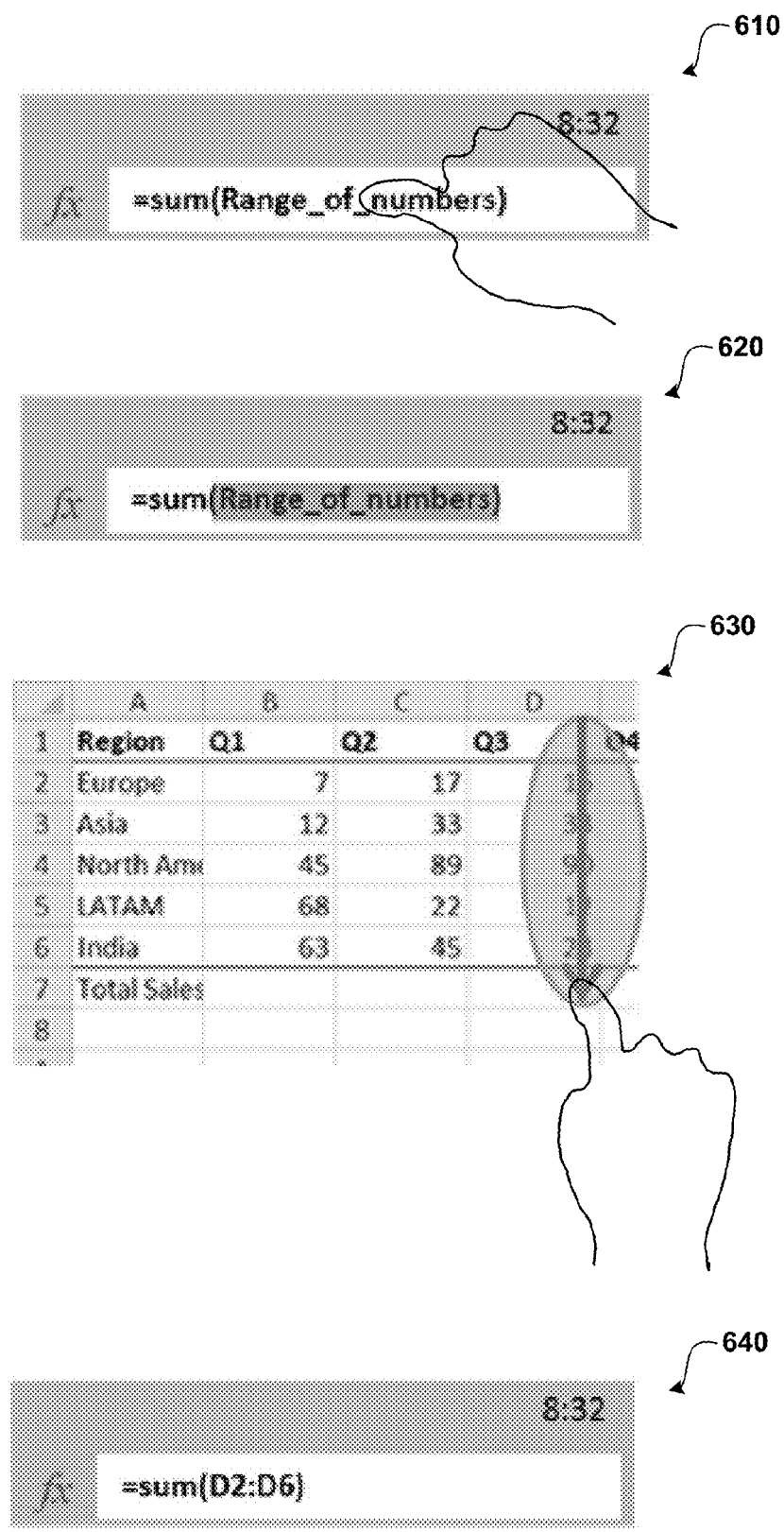
FIG. 6 illustrates a user using touch input to enter a value of a parameter within a formula.

FIG. 6 illustrates a user using touch input to enter a value of a parameter within a formula.

Formula bar 610 shows a sum formula that includes a single range of numbers parameter. As illustrated, a user is selecting the parameter by tapping on the parameter. In some cases, the parameter may already be selected (e.g. upon initial display of the formula within the formula bar). According to an embodiment, a value for a range parameter (e.g. D2:D6) uses two taps to select both the D2 and the D6. The first tap selects the D2 value and the second tap selects the D6 parameter.

Formula bar 620 illustrates the highlighting/selection of the Range_of_numbers parameter.

Display 630 shows a user specifying a range using a touch input for selecting a value for the Range_of_numbers parameter. As illustrated, the user has specified the range by dragging their finger down a column of display 630. According to an embodiment, a user may place their finger on an initial cell and then without lifting their finger off of the display drag their finger down until the user has selected the desired number of cells. A graphical indicator (e.g. border, shading, . . . ) may be used to distinguish the currently selected cells. Once the user has selected the desired cells, they may move their finger off of the touch screen such that it is not detected. While a column of cells has been selected, any number of cells may be selected. For example, one or more cells from one or more columns may be selected.

Formula bar 640 shows the value "D2:D6" automatically inserted and replacing the Range_of_numbers parameter in response to the touch input selecting the range of cells in Display 630.

Figure 7:
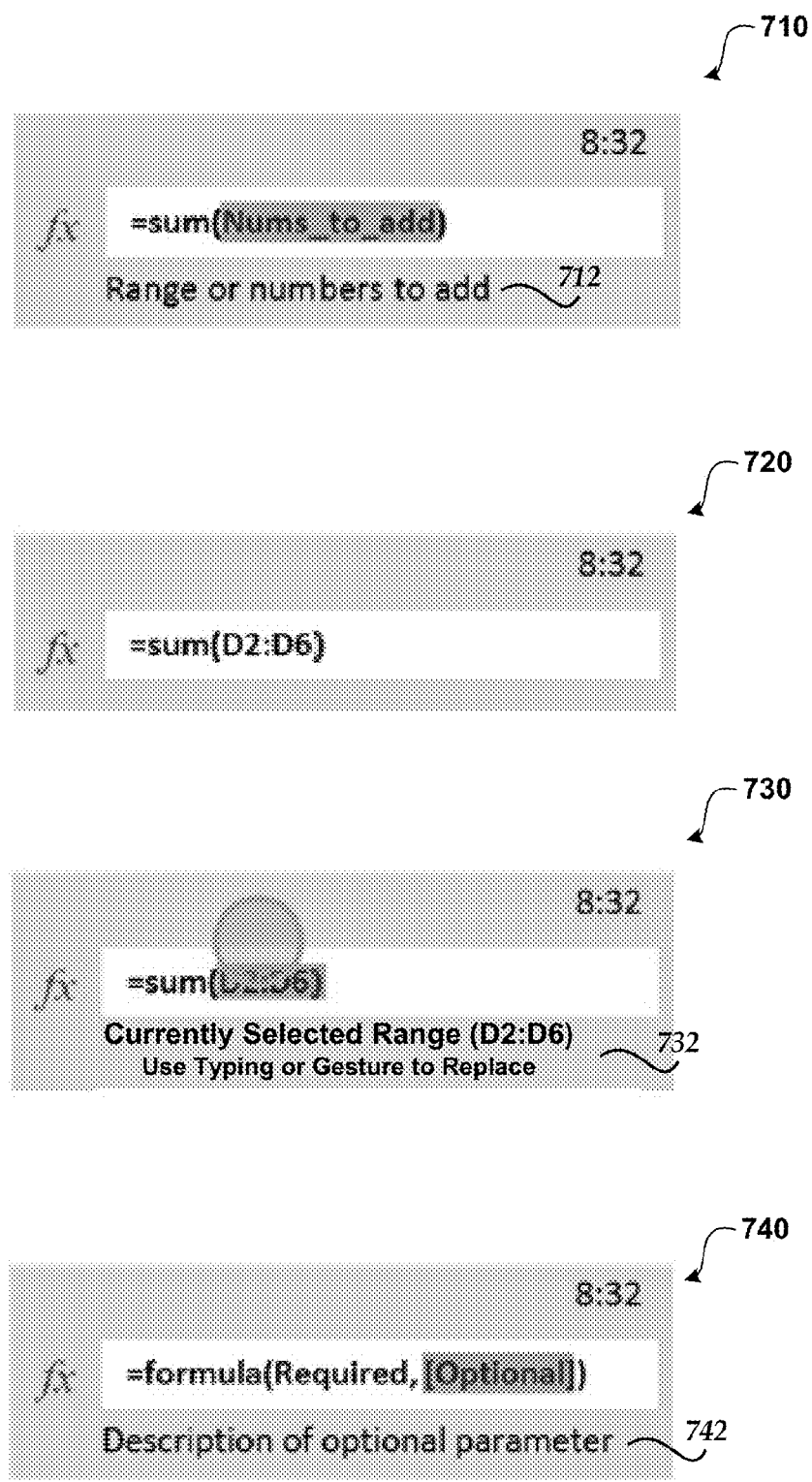
FIG. 7 illustrates a display of tooltips within a formula bar.

FIG. 7 illustrates a display of tooltips within a formula bar.

Formula bar 710 illustrates a sum formula including the Nums_to_add parameter selected along with tooltip 712 that provides a brief description to a user to assist them in entering a value for the parameter. As illustrated, the tooltip is displayed within the formula bar. Displaying the tooltip within the formula bar is directed at allowing a user to easily see the tooltip on a limited display device without having to move windows or obscure other items on the limited display device. According to an embodiment, the text selection and tooltip is displayed until the user either selects the next parameter or leaves the current cell of the spreadsheet.

Formula bar 720 shows that the tooltip or the text selection is not displayed when the user navigates back to a cell at a later time since a parameter of the formula does not include a current focus.

Formula bar 730 shows the selection of the parameter value "D2:D6". In response to the selection, tooltip 732 is displayed that shows a user a brief summary and instructions on how to replace the current selection.

Formula bar 740 shows a display of a formula that includes a display of an optional parameter. When an optional parameter is selected, a tooltip 742 displays a description of the optional parameter.

Figure 8:
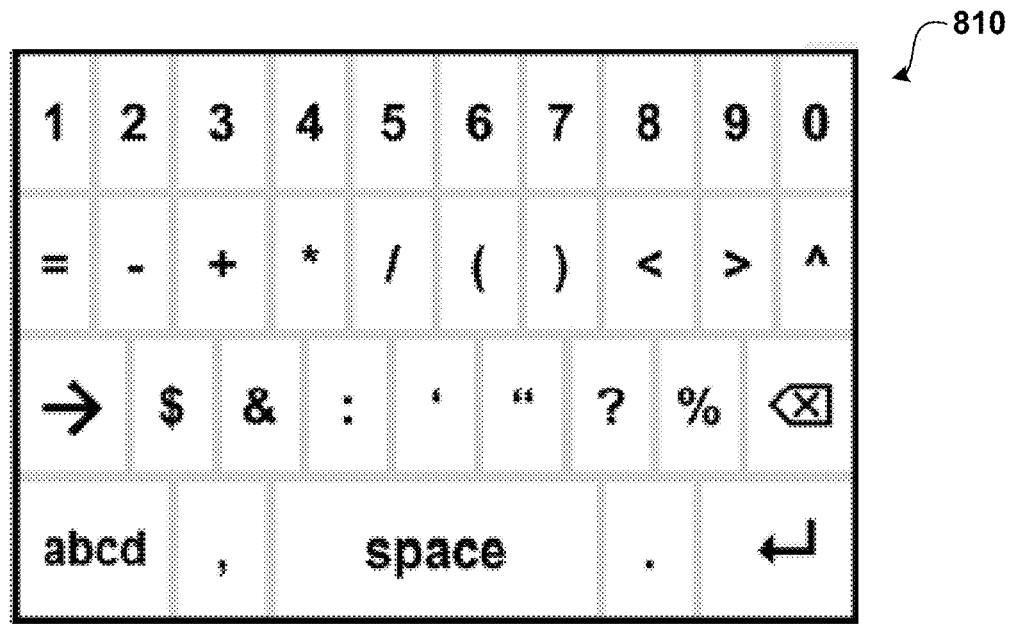
FIGS. 8 and 9 show exemplary SIPs for data entry into a formula bar.
Figure 8:
Figure 9:
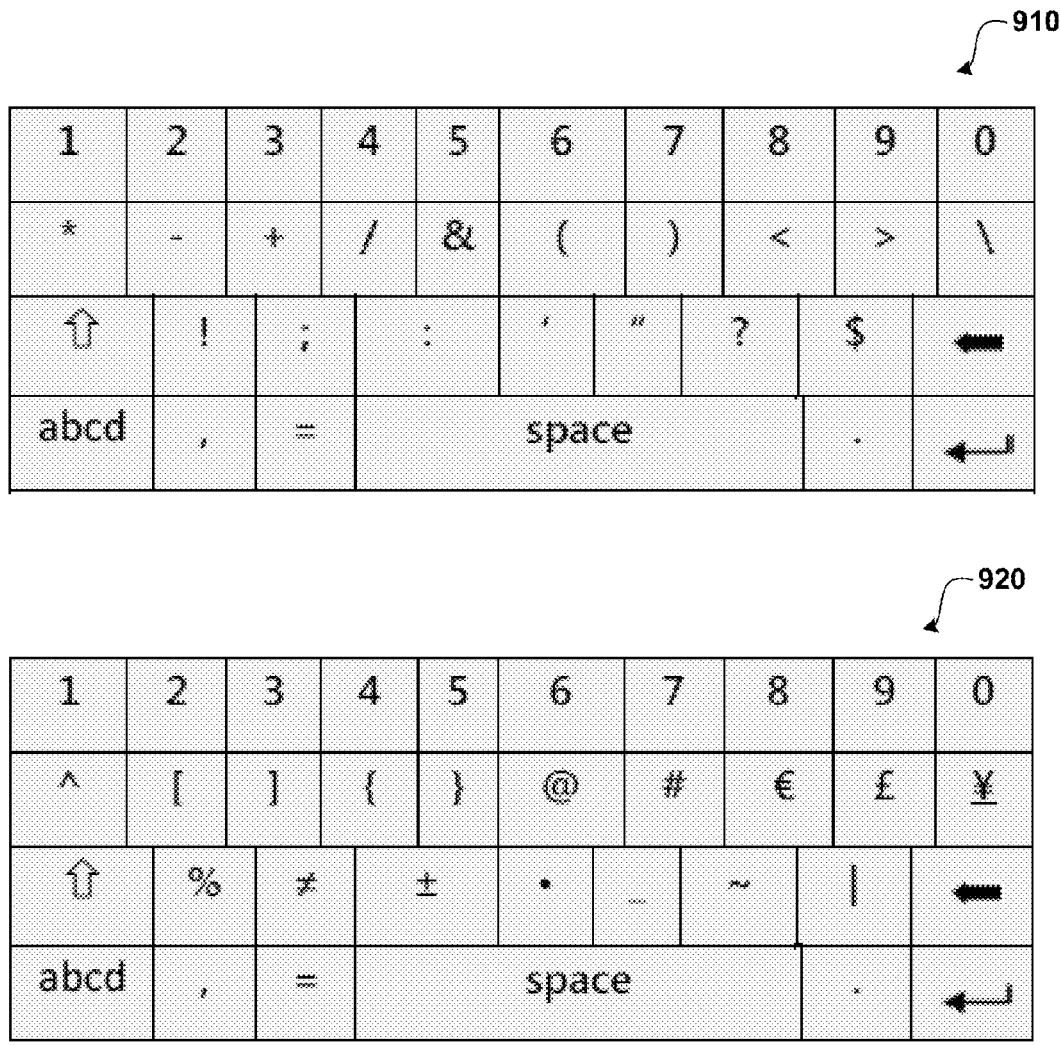

FIGS. 8 and 9 show exemplary SIPs for data entry into a formula bar.

SIP 810 shows an example of a SIP optimized for data entry of formulas. SIPs that are used for other purposes (e.g. word processing input, web page input, . . . ) are generally not configured for easy entry of formulas within a spreadsheet. For example, a user may have to switch between character panels a large number of times when using a non-optimized SIP for a spreadsheet application in order to enter a formula that is used in spreadsheets. According to an embodiment, the following characters illustrated between the brackets are displayed on a first panel for the SIP: [=−+*%&( )/:^< >$",.]. Other character placements may be used depending on an optimization for the entry of the formulas. For example, see SIP panel 910 and SIP panel 920 illustrated in FIG. 9.

SIP 910 of FIG. 9 shows a first SIP panel and SIP 920 shows a second panel.

Figure 10:
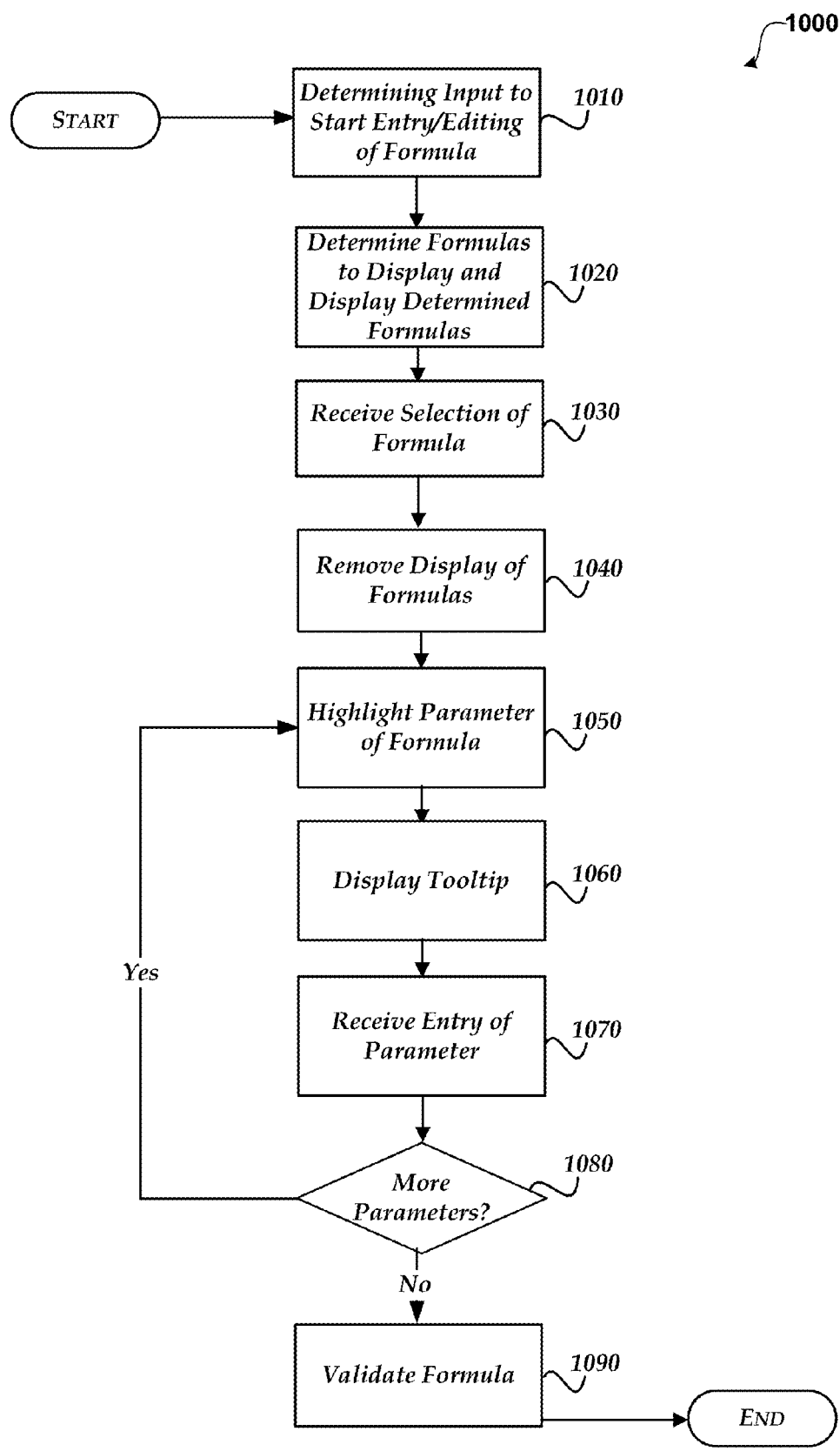
FIG. 10 shows an illustrative processes relating to entry/editing of a formula.

Referring now to FIG. 10 an illustrative processes 1000 is described relating to entry/editing of a formula. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 1010, where input is received to start entry/editing of a formula. The input may be touch input and/or character input (e.g. through a keyboard/SIP). According to an embodiment, when the formula bar is empty, the user may tap a formula button and/or begin typing within the formula bar. When the formula bar already includes a formula, a parameter may be selected for editing and/or the formula may be replaced by selection of another formula. According to an embodiment, in response to a user tapping on a parameter, the parameter is selected and highlighted for editing.

Moving to operation 620, the formulas to display are determined. When the formula bar is empty, the list of formulas to display can be determined from each of the available formulas. For example, the list of formulas to display may start with: the most popular formulas, recently used formulas, an alphabetical list, a category list with formulas arranged by category, and the like. According to an embodiment, the input entered into the formula bar is used to filter the displayed formulas. As each character is entered, the formulas displayed may dynamically change. As the user types characters of a formula name, the list of formulas displayed is modified dynamically. A user may also delete one or more characters from the function name that exists and/or the user typed in. The dynamic filtering of the function list can therefore result in either reducing or expanding the list of formulas being displayed. Once the formulas are determined, the formulas are displayed. The formulas may be displayed using different methods. For example, the formulas may be displayed alpha-blended over a display of a spreadsheet, displayed to cover all/portion of the display, and the like. According to an embodiment, the formulas are displayed along with a display of the formula bar and a SIP. When the SIP is removed from the display, the display of the formulas may occupy the portion of the display previously showing the SIP.

Flowing to operation 1030, a selection of a formula is received. According to an embodiment, the user may enter each character of the formula or select the formula from the displayed list of formulas. For example, a tap may be received from a user to select one of the displayed formulas.

Transitioning to operation 1040, the display of the formulas is removed from the limited display device. The selected formula is placed within the formula bars along with the parameters for the formula. Optional parameters may be distinguished from required parameters for the formula. For example, optional parameters may be placed within square parenthesis (e.g. =FormulaName(parameter_1, parameter_2, [Optional_parameter]).

Moving to operation 1050, a parameter of the formula is selected/highlighted. When a new formula is placed within the formula bar, the first parameter that needs to be specified is selected. Generally, the first parameter of the formula is highlighted. When a parameter within the formula is selected by a user, then the selected parameter is highlighted.

Flowing to operation 1060, a tooltip may be displayed. The tooltip may convey different information. For example, the tooltip may provide one or more of: a short description of the formula; a short description of one or more parameters (e.g. the selected parameter), an error message, and the like. According to an embodiment, a tooltip is displayed in response to selecting/highlighting a parameter either automatically/manually.

Transitioning to operation 1070, entry of a value for the currently selected parameter is received. The value may be received through entry of characters using a keyboard/SIP and/or a gesture through touch input. For example, a user may select a value within a cell, select multiple cells, and the like. The multi-selection of cells may include cells within one or more rows and one or more columns of the spreadsheet. The multi-selection of the cells may occur in continuation with the touch input received for the initial selection of a cell and/or at a later point in time. For example, a tap may be initially received to select a cell and then a separate drag input from the cell to other cells may be used to include fewer or more cells. Once the user has selected the desired cells, they may move their finger off of the touch screen such that it is not detected. After specifying the value, the highlighted parameter is replaced with the value.

Moving to decision operation 1080, a decision is made to determine when there are other parameters to enter for the formula. According to an embodiment, the decision is based on parameters that are required to be entered for the formula. According to another embodiment, the decision may include optional parameters. For example, when a formula includes two parameters and a value for the first parameter has been entered but not the value for the second parameter then there are more parameters to enter.

When there are parameters left to be entered, the process moves to operation 1050, where the next parameter is highlighted.

When there are not parameters left to be entered, the process flows to operation 1090 where the formula is validated.

At operation 1090, the formula is validated to determine if the formula has been entered correctly. For example, the formula may be validated to ensure that the parameters needed for operation have been provided and that the parameters specified are of the right dimensionality (e.g. does not have a range reference where only a cell reference is acceptable). When the formula is not determined to be valid an error may be displayed (e.g. within a tooltip) that requests the user to correct the formula. When the formula is determined to be valid, the process moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for entering a formula for a spreadsheet using a limited display device including a touch screen configured to receive touch input, comprising:
    determining an input to start an entry of a formula within a formula bar, wherein the formula bar displays formulas located elsewhere in selected cells of the spreadsheet;
    in response to the input, determining a list of formulas from available formulas to display on the limited display device;
    displaying the list of formulas on the limited display device;
    receiving a selection of a formula in the displayed list of formulas;
    in response to receiving the selection of the formula, removing the display of the list of formulas and displaying the selected formula and associated parameters within the formula bar and highlighting a first parameter of the displayed formula within the formula bar;
    receiving entry of a new value for the highlighted first parameter of the displayed formula within the formula bar such that the highlighted first parameter is changed; and
    upon receiving entry of the value for the highlighted first parameter of the displayed formula within the formula bar, automatically highlighting a second parameter of the displayed formula within the formula bar such that when highlighted a new value may be entered in place of the second parameter of the displayed formula within the formula bar, wherein each successive parameter of the formula is automatically highlighted and new values may be entered in placed of each successive parameter when highlighted until each parameter of the formula is entered, wherein the highlighting and the successive entry of the values for the first and second parameters of the displayed formula occur in the same formula bar.

2. The method of claim 1, wherein receiving entry of the value for the parameter of the formula using at least one of: the Software Input Panel (SIP) and the touch input comprises receiving a multi-cell selection of cells of a spreadsheet displayed on the limited display device using the touch input that is used to set the value for the parameter.

3. The method of claim 2, wherein the multi-cell selection specifies a range that is used to set the value for the parameter.

4. The method of claim 1, further comprising receiving a touch input on a parameter of the formula and selecting the parameter receiving the touch input.

5. The method of claim 1, further comprising configuring the SIP such that characters comprising the following characters: −, +, %, &, (, ), /, ^, <, >, $, " are displayed on a single screen of the SIP.

6. The method of claim 1, further comprising validating entry of the formula to determine that each non-optional parameter of the formula is entered correctly before exiting a formula editing mode and when a parameter is not entered correctly providing a warning message within the formula bar that comprises a display of the formula.

7. The method of claim 1, further comprising displaying parameter tooltips within the formula bar that comprises a display the formula.

8. The method of claim 7, wherein displaying the parameter tooltips within the formula bar occurs in response to a parameter within the formula being highlighted or selected.

9. The method of claim 1, wherein displaying the parameter tooltips within the formula bar occurs in response to a determination that a parameter has not been entered.

10. The method of claim 1, further comprising displaying a quick sum option within the formula bar that when selected displays summary information for selected cells of a spreadsheet.

11. A computer-readable device not consisting of a communication media having computer-executable instructions for entering a formula for a spreadsheet using a limited display device including a touch screen configured to receive touch input, comprising:
    in response to receiving input within a formula bar, displaying a list of formulas on the limited display device, wherein the formula bar displays formulas located elsewhere in selected cells of the spreadsheet;
    receiving a touch selection of a formula in the displayed list of formulas;
    in response to receiving the selection of the formula, removing the display of the list of formulas and displaying the selected formula and associated parameters within the formula bar and highlighting a first parameter of the displayed formula within the formula bar;
    receiving entry of a new value for the highlighted first parameter of the displayed formula within the formula bar such that the highlighted first parameter is changed; and
    upon receiving entry of the value for the first parameter of the displayed formula within the formula bar, automatically highlighting a second parameter of the displayed formula within the formula bar such that when highlighted a value may be entered in place of the second parameter of the displayed formula within the formula bar, wherein each successive parameter of the formula is automatically highlighted and a value may be entered in place of each successive parameter when highlighted until each parameter of the formula is entered, wherein the highlighting and the successive entry of the values for the first and second parameters of the displayed formula occur in the same formula bar.

12. The computer-readable device of claim 11, wherein receiving entry of the value for the parameter of the formula using at least one of: the Software Input Panel (SIP) and the touch input comprises receiving a multi-cell selection of cells of a spreadsheet displayed on the limited display device using the touch input that is used to set the value for the parameter.

13. The computer-readable device of claim 11, further comprising receiving a touch input on a parameter of the formula and selecting the parameter receiving the touch input.

14. The computer-readable device of claim 11, further comprising configuring the SIP such that characters comprising the following characters: −, +, %, &, (, ), /, ^, <, >, $, " are displayed on a single screen of the SIP.

15. The computer-readable device of claim 11, further comprising validating entry of the formula to determine that each non-optional parameter of the formula is entered correctly before exiting a formula editing mode and when a parameter is not entered correctly providing a warning message within a formula bar that comprises a display of the formula.

16. The computer-readable device of claim 11, further comprising displaying parameter tooltips within the formula bar that comprises a display the formula in response to a parameter within the formula being highlighted or selected.

17. The computer-readable device of claim 11, wherein displaying the parameter tooltips within the formula bar occurs in response to a determination that a parameter has not been entered correctly.

18. A system for entering a formula for a spreadsheet, comprising:
 a display;
 a touch surface that is configured to receive touch input;
 a processor and a computer-readable device not including a signal;
 an operating environment stored on the computer-readable device and executing on the processor; and
 a formula manager operating under the control of the operating environment and operative to:
  in response to receiving input within a formula bar using a Software Input Panel (SIP) comprising the following characters: −, +, *, (, ), /, ^, <, >, $, " are displayed on a single screen of the SIP, displaying a list of formulas on the limited display device, wherein the formula bar displays formulas located elsewhere in selected cells of the spreadsheet;
  receiving a touch selection of a formula in the displayed list of formulas;
  in response to receiving the selection of the formula, removing the display of the list of formulas and displaying the selected formula and associated parameters within the formula bar and highlighting a first parameter of the displayed formula within the formula bar;
  receiving entry of a new value for the highlighted first parameter of the displayed formula within the formula bar, such that the highlighted first parameter is changed, from a touch input device that comprises receiving a multi-cell selection of cells of a spreadsheet displayed on the limited display device using the touch input that is used to set the value for the parameter; and
  upon receiving entry of the value for the first parameter of the displayed formula within the formula bar, automatically highlighting a second parameter of the displayed formula within the formula bar such that when highlighted a value may be entered in place of the second parameter of the displayed formula within the formula bar, wherein each successive parameter of the formula is automatically highlighted and a value may be entered in placed of each successive parameter when highlighted until each parameter of the formula is entered, wherein the highlighting and the successive entry of the values for the first and second parameters of the displayed formula occur in the same formula bar.

19. The system of claim 18, further comprising validating entry of the formula to determine that each non-optional parameter of the formula is entered correctly before exiting a formula editing mode and when a parameter is not entered correctly providing a warning message within a formula bar that comprises a display of the formula.

20. The system of claim 18, further comprising displaying parameter tooltips within the formula bar that comprises a display the formula in response to at least one of: a parameter within the formula being highlighted; a parameter within the formula being selected; and in response to a determination that a parameter has not been entered correctly.

\* \* \* \* \*